United States Patent [19]

Reitz et al.

[11] 4,175,096
[45] Nov. 20, 1979

[54] ALKOXYLATED PERFLUOROALKANESULPHONAMIDES

[75] Inventors: Gunther Reitz, Cologne; Günther Boehmke, Leverkusen, both of Fed. Rep. of Germany

[73] Assignee: Bayer Aktiengesellschaft, Leverkusen, Fed. Rep. of Germany

[21] Appl. No.: 829,145

[22] Filed: Aug. 30, 1977

[30] Foreign Application Priority Data

Sep. 2, 1976 [DE] Fed. Rep. of Germany ....... 2639473

[51] Int. Cl.² .................. C07C 143/70; C07C 143/74
[52] U.S. Cl. ............................................. 260/556 F
[58] Field of Search ...................... 260/565 F

[56] References Cited

U.S. PATENT DOCUMENTS

| | | | |
|---|---|---|---|
| 2,915,554 | 12/1959 | Ahlbrecht et al. | 260/556 F |
| 3,721,706 | 3/1973 | Hoffmann et al. | 260/556 F UX |
| 3,829,466 | 8/1974 | Staffe et al. | 260/556 F X |
| 3,864,396 | 2/1975 | Staffe et al. | 260/556 F |

FOREIGN PATENT DOCUMENTS

| | | | |
|---|---|---|---|
| 2307377 | 8/1974 | Fed. Rep. of Germany | 260/556 F |
| 2457754 | 6/1976 | Fed. Rep. of Germany | 260/556 F |
| 1377303 | 12/1974 | United Kingdom . | |

*Primary Examiner*—Allen B. Curtis
*Attorney, Agent, or Firm*—Sprung, Felfe, Horn, Lynch & Kramer

[57] ABSTRACT

Alkoxylated perfluoroalkanesulphonamides which are obtained by reacting perfluoroalkanesulphonamidoamines of the formula

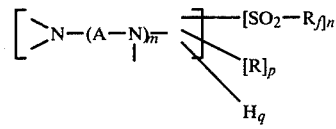

in which
$R_f$ denotes $C_1$–$C_{18}$-perfluoroalkyl, it also being possible, for $n>1$, for the radicals $R_f$ to be different,
A denotes $C_2$–$C_8$-alkylene, which can be straight-chain or branched,
R denotes $C_1$–$C_8$ alkyl, it also being possible, for $p>1$, for the radicals R to be different,
m denotes a number from 1 to 10,
n denotes a number from 1 to m,
p denotes a number from 0 to m+2 and
q denotes a number from 0 to m+2,
and in which
the sum of n+p+q is m+3,
with alkylene oxides, can be used as wetting agents, emulsifiers and dispersing agents and as agents for rendering paper, leather and textiles oleophobic.

4 Claims, No Drawings

ALKOXYLATED PERFLUOROALKANESULPHONAMIDES

The invention relates to alkoxylated perfluoroalkanesulphonamides, which are obtained by reacting perfluoroalkanesulphonamidoamines with alkylene oxides.

Preferred starting compounds are perfluoroalkanesulphonamidoamines of the formula

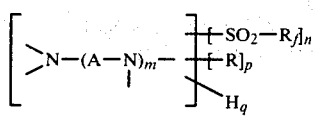  I in which
$R_f$ denotes $C_1$-$C_{18}$-perfluoroalkyl, it also being possible, for n>1, for the radicals $R_f$ to be different,
A denotes $C_2$-$C_8$-alkylene, which can be straight-chain or branched,
R denotes $C_1$-$C_8$-alkyl, it also being possible, for p>1, for the radicals R to be different,
m denotes a number from 1 to 10,
n denotes a number from 1 to m,
p denotes a number from 0 to m+2 and
q denotes a number from 0 to m+2,
and in which
the sum of n+p+q is m+3.

$C_4$-$C_{12}$-Perfluoroalkyl radicals may be mentioned, in particular, for $R_f$, for example the $C_3F_7$, $C_6F_{13}$, $C_{10}F_{21}$ and $C_{12}F_{25}$ radical and, in particular, the $C_4F_9$ and $C_8F_{17}$ radical.

Possible alkylene groups A are, preferably, ethylene, 1,2-propylene and 1,3-propylene.

Alkyl radicals with 1-4 C atoms, especially methyl, are preferred as radicals R.

Compounds in which m=1 to 5, n=1 to 3 and p=1 or 2 are particularly suitable. The compounds of the formula (I) are known, for example, from DT-OS (German Published Specification) No. 2,161,341 and DT-OS (German Published Specification) No. 2,457,754. As a rule, their synthesis is carried out by reacting an activated perfluoroalkanesulphonic acid derivative, for example a perfluoroalkanesulphonyl fluoride, with a polyamine.

Preferred alkylene oxides are ethylene oxide and propylene oxide.

The reaction of the compounds (I) with ethylene oxide is effected by carrying out the reaction in an autoclave under pressure, or by passing a gaseous stream of ethylene oxide through the reaction mass under normal pressure in such a way that all the ethylene oxide reacts. If propylene oxide is used in the reaction, it can also be carried out under pressure, or the propylene oxide is added under normal pressure. The reaction can also be carried out with a propylene oxide/ethylene oxide mixture or the two oxides can be reacted successively in any desired sequence. The reaction is carried out with 1 to 50 mols, preferably up to 20 mols, of alkylene oxide per mol of the compound (I).

Water can be used as the medium for the reaction of the perfluoroalkanesulphonamidoamine of the formula (I) with the alkylene oxide and in particular, above all, in the case of those compounds of the general formula (I) which, through the amine part of the molecule or through the perfluoroalkanesulphonamido nitrogen $Rf-SO_2-NH$, which can be deprotonated, possess a certain polarity and thus a certain affinity to water. In this case, the reaction can be carried out in the weakly alkaline, that is to say up to about pH 12, in the neutral or in the acid pH range. The compounds of the formula (I) are preferably dissolved in from one to five times their amount of water, or suspended therein, and the alkylene oxide is then added.

A mixture of water and an organic solvent can advantageously be used as the reaction medium, it being possible to vary the ratio of the mixture as desired. The pH value of the mixture can be adjusted to weakly alkaline (up to pH 12), neutral or acid (down to pH 1) by adding alkali metal hydroxide solutions, such as, for example, sodium hydroxide solution or potassium hydroxide solution, or by adding acid, for example HCl, formic acid or acetic acid. The reaction is advantageously carried out by predissolving the perfluoroalkanesulphonamidoamine of the formula (I) in 0.1 to 5 parts, relative to the compound (I), of organic solvent, then adding 0.1 to 5 parts of water and adjusting the mixture to the desired pH value. The alkylene oxide is then added and the reaction is carried out. Polar protic compounds can be used as the organic solvents, for example alcohols, such as methanol, ethanol, propanol, isopropanol, butanol, isobutanol, glycol, glycerol, diethylene glycol, triethylene glycol, tetraethylene glycol, polyglycol, propanediols or butanediols, or carboxylic acids, such as acetic acid or formic acid. Enolisable compounds can also be used as the organic solvents, for example ketones, such as acetone, methyl ethyl ketone and cyclohexanone. Polar aprotic solvents are also suitable, such as dimethylformamide, dimethylsulphoxide, hexamethylphosphoric acid triamide, acetonitrile or ethers, such as dioxane, diethyl ether, dimethyl ether, dipropyl ether, diisopropyl ether, diiso-butyl ether, ethylene glycol dimethyl ether or diethylene glycol dimethyl ether. It is also possible to choose those organic solvents which are immiscible or sparingly miscible with water, for example chlorohydrocarbons, such as $CH_2Cl_2$, $CHCl_3$, $CCl_4$, trichloroethylene or perchloroethylene, or hydrocarbons, such as toluene, cyclohexane or xylene. Mixtures of these solvents can also be used.

The reaction of the perfluoroalkanesulphonamidoamines of the general formula (I) with the alkylene oxides can also be carried out in anhydrous, protic solvents. Such solvents which may be mentioned are, in particular, carboxylic acids, such as acetic acids or formic acid, and alcohols, such as methanol, ethanol, isopropanol or glycol. Mixtures of these solvents can also be employed.

Mixtures of protic and aprotic organic solvents can also be used as the reaction medium. Such protic solvents are the alcohols and carboxylic acids already mentioned above. The aprotic solvents can be polar, such as acetone, methyl ethyl ketone, cyclohexanone, dimethylformamide, dimethylsulphoxide, hexamethylphosphoric acid triamide, acetonitrile or ethers, such as dioxane, diethyl ether, dimethyl ether, diisopropyl ether, dipropyl ether, di-iso-butyl ether, ethylene glycol dimethyl ether or diethylene glycol dimethyl ether, or the aprotic solvents can be non-polar, such as toluene, xylene, cyclohexane, petroleum ether, $CH_2Cl_2$, $CHCl_3$, $CCl_4$, trichloroethylene, perchloroethylene or trichloroethane. In this case also, the reaction can take place in a weakly alkaline, neutral or acid medium.

The reaction temperatures for the reaction of compounds of the formula (I) with the alkylene oxides are 10° to 150° C., preferably 20° to 70° C.

Compounds of the formula (I) which may be mentioned in particular are the reaction products of ethylenediamine and one equivalent of perfluorooctanesulphonyl fluoride, diethylenetriamine and one equivalent of perfluorooctanesulphonyl fluoride, diethylenetriamine and two equivalents of perfluorooctanesulphonyl fluoride, diethylenetriamine and two equivalents of perfluorobutanesulphonyl fluoride, triethylenetetramine and one equivalent of perfluorooctanesulphonyl fluoride, triethylenetetramine and two equivalents of perlfuorcotanesulphonyl fluoride, triethylenetetramine and two equivalents of perfluorobutanesulphonyl fluoride, tetraethylenepentamine and one equivalent of perlfuoroctanesulphonyl fluoride, tetraethylenepentamine and two equivalents of perfluorooctanesulphonyl fluoride, tetraethylenepentamine and two equivalents of perfluorobutanesulphonyl fluoride, pentaethylenehexamine and one equivalent of perfluorooctanesulphonyl fluoride, pentaethylenehexamine and two equivalents of perfluorooctanesulphonyl fluoride, pentaethylenehexamine and three equivalents of perfluorooctanesulphonyl fluoride, pentaethylenehexamine and two equivalents of perfluorobutanesulphonyl fluoride, pentaethylenehexamine and three equivalents of perfluorobutanesulphonyl fluoride, hexamethylenediamine and one equivalent of perfluorooctanesulphonyl fluoride, propylenediamine and one equivalent of perfluorooctanesulphonyl fluoride, tetramethylenediamine and one equivalent of perfluorooctanesulphonyl fluoride, N,N-dimethylpropylenediamine and one equivalent of perfluorooctanesulphonyl fluoride, N,N-diethylpropylenediamine and one equivalent of perfluorooctanesulphonyl fluoride, N-methyl-bis-(3-amino-propyl)-amine and one equivalent of perfluorooctanesulphonyl fluoride, N-methyl-bis-(3-aminopropyl)-amine and two equivalents of perfluorooctanesulphonyl fluoride, N-methyl-bis-(3-aminopropyl)-amine and two equivalents of perfluorobutanesulphonyl fluoride, N-methyl-bis-(2-aminoethyl)-amine and one equivalent of perfluorooctanesulphonyl fluoride, N-methyl-bis-(2-aminoethyl)-amine and two equivalents of perfluorooctanesulphonyl fluoride, N-methyl-bis-(2-aminoethyl)-amine and two equivalents of perfluorobutanesulphonyl fluoride, N-methylethylenediamine and one equivalent of perfluorooctanesulphonyl fluoride, N-methylpropylenediamine and one equivalent of perfluorooctanesulphonyl fluoride, N,N-dimethylethylenediamine and one equivalent of perfluorooctanesulphonyl fluoride, bis-(3-amino-propyl)-amine and one equivalent of perfluorooctanesulphonyl fluoride, bis-(3-aminopropyl)-amine and two equivalents of perfluorooctanesulphonyl fluoride and bis-(3-amino-propyl)-amine and two equivalents of perfluorobutanesulphonyl fluoride.

The reaction products mentioned above are frequently mixtures of isomers which can be employed as such and do not need to be separated. They can contain one or more primary, secondary or tertiary amino groups.

The amino groups can be converted into secondary, tertiary or quaternary groups during the reaction with the alkylene oxides.

The quaternisation reaction can only take place in the presence of a solvent which can be deprotonated. Water, alcohols or carboxylic acids can be used as such solvents.

The alkylene oxides also react to a certain extent with the protic solvents, such as water, alcohols or carboxylic acids. However, the actual reaction of the alkylene oxides with the amino groups of the compounds of the formula (I) is not prevented by these side reactions. The optimum choice of the compounds (I) and the suitable solvents can be determined in a simple manner by preliminary experiments.

Preferred oxyalkylation products according to the invention are those of the formula

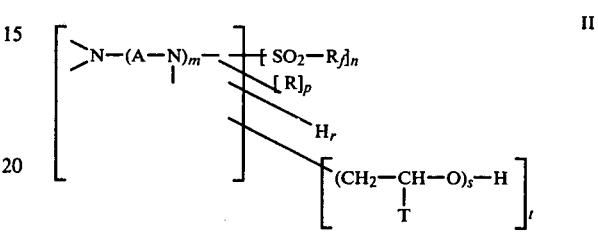

and their quaternisation products. In the formula, $R_f$, A, R, m, n and p have the meaning given under formula (I) and T represents hydrogen and/or methyl,
r represents 0 to m+1,
s represents 2 to 50 and
t represents 1 to m+2.

The sum of n+p+r+t is m+3. Radicals of the formula

are additionally present in the quaternisation products, so that in this case the sum of m+3 is exceeded. Those quaternisation products which contain 1 to (m−n) quaternised nitrogen atoms per molecule, that is to say that the sum of the substituents is then m+4 to 2 m+3, are preferred.

Amongst the compounds of the formula II, the compounds of the formulae

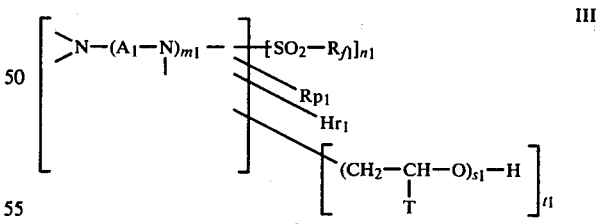

and

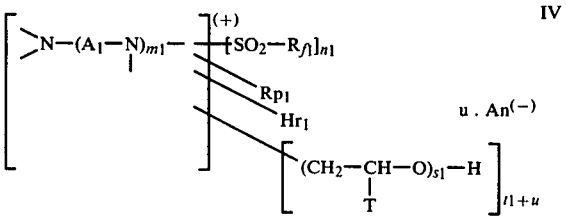

wherein
$R_{f1}$ denotes $C_4$-$C_{12}$-perfluoroalkyl, in particular $C_4F_9$ or $C_8F_{17}$, $A_1$ denotes ethylene, 1,2-propylene or 1,3-propylene,
$R_1$ denotes $C_1$–$C_4$-alkyl, in particular methyl,
$m_1$ denotes 1 to 5,
$n_1$ denotes 1 to 3,
$p_1$ denotes 0 or 1,
$r_1$ denotes 0 to $m_1+1$,
$s_1$ denotes 2 to 20,
$t_1$ denotes 1 to $m_1+2$,
$u$ denotes 1 to $m_1-n_1$ and
$An^{(-)}$ denotes an anion,
and the sum of $n_1+p_1+r_1+t_1$ is $m_1+3$, or the sum of $n_1+p_1+r_1+t_1+u$ in the compounds IV is up to $2m_1+3$, are to be singled out. In general, the anions are determined by the preparation process. However, they can also be replaced by other anions in a known manner. Formates, acetates, chlorides, sulphates, phosphates, phosphonates, toluenesulphonates and methosulphates are preferred.

The alkoxylated perfluoroalkanesulphonamidoamines according to the invention possess a great affinity to water and are soluble therein. The solubility in water can be used as a criterion for the degree of the reaction with the alkylene oxides. At the start of the reaction the perfluoroalkanesulphonamidoamine is either undissolved from the beginning or it is precipitated by diluting the mixture with water and acidifying with HCl. However, after the reaction with the alkylene oxides the reaction mixtuure can be diluted with water as desired in the acid and alkaline pH range.

The products according to the invention possess valuable properties as wetting agents, emulsifiers and dispersing agents and for the oleophobic finishing of paper, leather, textiles and carpets.

It is also to be mentioned in particular that, because of the quaternisation of the amino nitrogen atoms, relatively small amounts of alkylene oxides are sufficient to make the products water-soluble.

EXAMPLE 1

251 g of $C_8F_{17}SO_2F$ are added dropwise to 200 ml of dioxane and 47.3 g of tetraethylenepentamine at 50° C. under nitrogen. 11 g of triethylamine are then also added in portions and, after stirring overnight, the mixture is evaporated. About 30 g of ethylene oxide are passed into a mixture of 50 g of the product thus obtained, 50 g of $H_2O$, 1.9 g of 45% strength sodium hydroxide solution and 50 ml of alcohol at 70°–80° C. The product thus obtained is miscible with water in all proportions in the pH range from 1 to 12.

If the alcohol is distilled off in vacuo, a gel-like substance, which after complete drying at room temperature is petroleum jelly-like to wax-like, remains with the rest of the water.

An impregnation of unsized, wood-free paper weighing 50 g/m² by treatment in a 0.2% strength aqueous solution exhibited, after drying, an impermeability to oil of 6, that is to say a drop of turpentine or paraffin oil does not become absorbed in the paper and does not wet the fibre.

The impermeability to oil is evaluated by the ratings 0 to 6. The rating 0 means: no effect, the rating 6 means: very good effect.

EXAMPLE 2

125.5 g of $C_8F_{17}SO_2F$ are added dropwise to 250 ml of dioxane and 29 g of pentaethylenehexamine at 50° C. under nitrogen and 10 g of triethyleneamine are then also added to accelerate the reaction. After stirring overnight, the mixture is evaporated. 149 g of this product are suspended in 150 g of $H_2O$ and partly dissolved with 5.6 g of 45% strength sodium hydroxide solution and the mixture is diluted with 150 ml of alcohol. About 75 g of ethylene oxide are then passed in at 70–80° C. The product is miscible with water in all proportions in the pH range from 1 to 12. The impermeability to oil according to Example 1 has the rating 6.

EXAMPLE 3

280 g of the monoperfluorooctanesulphonamide of methyl-bis-(3-aminopropyl)-amine, in the form of the hydrogen fluoride salt, are dissolved hot in 900 ml of ethanol and 38 g of 45.5% strength sodium hydroxide solution are added. After cooling to room temperature, the mixture is filtered and, after adding 26.5 g of acetic acid, evaporated. The residue is suspended hot in 170 g of $H_2O$ and 170 ml of alcohol and, in an autoclave, reacted at 40° C. with 180 g of ethylene oxide in portions. The product, which is very readily soluble in water, exhibits an impermeability to oil of 6, as described in Example 1.

EXAMPLE 4

50.2 g of $C_8F_{17}SO_2F$ are added dropwise to a mixture of 7.5 g of ethylenediamine, 12 g of triethylamine and 100 ml of acetonitrile at room temperature. The mixture is subsequently stirred for 14 hours, dissolved warm in 200 ml of acetone, 8.9 g of 45% strength NaOH solution are added and, after stirring thoroughly, the mixture is filtered. The filtrate, which is evaporated, is reacted, with 80 ml of alcohol and 30 ml of $H_2O$, with 35 g of ethylene oxide in an autoclave at 40° C. The resulting product mixture is readily soluble in water at an acid, neutral and alkaline pH value. An aqueous solution which contains 1 g/l of the above substance has a surface tension of 19.7 mN/m.

EXAMPLE 5

6.18 g of diethylenetriamine, 10.1 g of triethylamine and 100 ml of dioxane are warmed to 50° C. in a flask, then 55.2 g of perfluorooctanesulphonyl fluoride are added dropwise and the mixture is subsequently kept for a further six hours at that temperature, whilst stirring. After dissolving the mixture in 250 ml of alcohol, adding 9.8 g of 45% strength aqueous sodium hydroxide solution, stirring and filtering, the filtrate is evaporated and suspended again in 60 ml of alcohol and 60 ml of $H_2O$. A total of 71 g of ethylene oxide are injected into the mixture in a pressure autoclave in portions of 20–30 g each in the course of 10 hours. The red-brown solution formed is miscible with water in any desired proportions in the pH range from 4 to 12. An aqueous solution which contains 1 g/l of the above substance has a surface tension of 23.5 mN/m.

EXAMPLE 6

100 ml of methylene chloride and 18.9 g of tetraethylenepentamine are initially introduced in a reaction flask, 50.2 g of $C_8F_{17}SO_2F$ are then added dropwise so that the temperature does not rise above 40° C. and the mixture is subsequently stirred for a further 4 hours at 40° C. It is evaporated, the residue is dissolved hot in 300 ml of alcohol and 54.4 g of 25% strength sodium acetate solution are added. After filtration, the filtrate is again evaporated and the residue is dissolved in 60 ml of alcohol. After adding 60 ml of $H_2O$, the mixture is reacted with 35 g of ethylene oxide at 40°–50° C. in a pressure autoclave. A red-brown solution forms which is miscible with water in any desired proportions in the pH range from 1 to 12. An aqueous solution which contains 1 g/l of the above substance has a surface tension of 23 mN/m.

EXAMPLE 7

14.6 g of triethylenetetramine and 100 ml of methylene chloride are initially introduced in a reaction flask and 50.2 g of $C_8F_{17}SO_2F$ are added dropwise at room temperature. The mixture is subsequently stirred overnight at room temperature and evaporated, the residue is dissolved in 300 ml of alcohol, aqueous sodium acetate solution (25% strength) is added and the mixture is mixed and filtered. The filtrate is evaporated to a volume of about 80 ml, 40 ml of $H_2O$ are added and the mixture is oxyethylated with 40 g of ethylene oxide in a pressure autoclave at 40°–50° C. The red-brown solution formed is miscible with water in any desired proportion in the pH range from 1 to 12. The oil repellancy according to the standardised test AATCC-118-1966 T (American Dyestuff Rep. 56, 43 (1967)) gave the value 5 for cotton rags which had been dipped in a 0.5% strength aqueous solution, squeezed off to a weight increase of 80% and dried.

EXAMPLE 8

50.2 g of $C_8F_{17}SO_2F$ are added dropwise to a mixture of 23.2 g of pentaethylenehexamine and 100 ml of methylene chloride at room temperature and the mixture is stirred overnight. It is dissolved in 300 ml of alcohol, 32.8 g of 25% strength sodium acetate solution are added, the mixture is stirred and filtered and the filtrate is evaporated to a volume of 80 ml. After adding 40 ml of $H_2O$, the mixture is reacted with 70 g of ethylene oxide in an autoclave at 40°–50° C. A red-brown solution forms during this procedure, which is miscible with water in all proportions in the pH range from 1 to 12. The oil repellancy according to Example 7 gave the value 5.

EXAMPLE 9

50.2 g of $C_8F_{17}SO_2F$ are added dropwise to a mixture of 10.3 g of diethylenetriamine and 100 ml of $CH_2Cl_2$ at room temperature and the mixture is stirred overnight. It is evaporated, the residue is dissolved in 300 ml of alcohol and 54.4 g of sodium acetate solution (24% strength) are added. After filtration, the filtrate is evaporated to a volume of 100 ml, 20 ml of water are added and the mixture is reacted with 50 g of ethylene oxide in a pressure autoclave at 40°–50° C. The red-brown solution formed is miscible with water in all proportions in the pH range from 1 to 12. An aqueous solution which contains 1 g/l of the above substance has a surface tension of 20.5 mN/m.

EXAMPLE 10

60 g of the monoperfluorooctanesulphonamide of methyl-bis-(3-aminopropyl)-amine, in the form of the hydrogen fluroide salt, are reacted, with 60 g of $H_2O$ and 60 g of dioxane, with 70 g of ethylene oxide in portions in an autoclave at 50°–70° C. The product thus obtained is miscible with water in any desired proportion in the pH range from 1 to 12. An aqueous solution which contains 1 g/l of the above substance has a surface tension of 24.5 mN/m.

EXAMPLE 11

60 g of the monoperfluorooctanesulphonamide of methyl-bis-(3-aminopropyl)-amine, in the form of the hydrogen fluoride salt, are reacted, with 60 g of $H_2O$ and 60 g of acetone, with 90 g of ethylene oxide in portions in an autoclave at 50°–70° C. The product thus obtained is miscible with water in any desired proportion in the pH range from 1 to 12. An aqueous solution which contains 1 g/l of the above substance has a surface tension of 23.8 mN/m.

We claim:

1. Alkoxylated perfluoroalkanesulphonamide of the formula

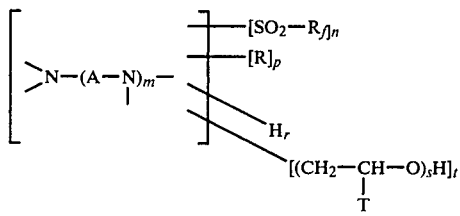

and its quaternization product wherein
$R_f$ is $C_1$–$C_{18}$ perfluoralkyl;
A is $C_2$–$C_8$-alkylene;
R is $C_1$–$C_8$-alkyl;
T is hydrogen or methyl;
m is a number from 2 to 10;
n is a number from 1 to m;
p is a number from 0 to m+2;
r is a number from 0 to m+1;
s is a number from 2 to 50;
t is a number from 1 to m+2; and
the sum of n+p+r+t is m+3 when the compound is not quaternized and is 2 m+3 when the compound is quaternized.

2. The compound of claim 1 wherein
$R_f$ is $C_4$–$C_{12}$-perfluoroalkyl;
A is ethylene, 1,2-propylene, or 1,3-propylene;
R is $C_1$–$C_4$-alkyl;
m is a number from 2 to 5;
n is a number from 1 to 3;
p is the number 0 or 1; and
s is a number from 2 to 20.

3. The compound of claim 2 wherein
$R_f$ is $C_4F_9$— or $C_8F_{17}$—; and
R is methyl.

4. The compound of claim 1 wherein
$R_f$ is $C_3F_7$, $C_4F_9$, $C_6F_{13}$, $C_8F_{17}$, $C_{10}F_{21}$, or $C_{12}F_{25}$;
A is ethylene, 1,2-propylene, or 1,3-propylene;
R is methyl;
m is a number from 2 to 5;
n is the number 1;
p is the number 0 or 1; and
s is a number from 2 to 20.

* * * * *